Figure 1:
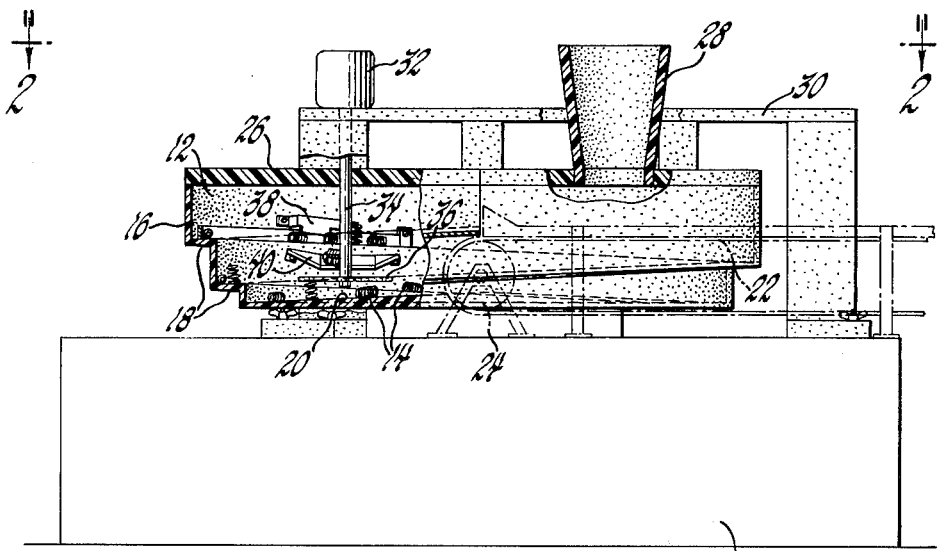

July 3, 1962

W. E. RISE 3,042,181

TANGLED SPRING SEPARATOR

Filed Jan. 27, 1960

2 Sheets-Sheet 1

INVENTOR.
William E. Rise
BY
R. P. Barnard
ATTORNEY

July 3, 1962

W. E. RISE 3,042,181

TANGLED SPRING SEPARATOR

Filed Jan. 27, 1960

2 Sheets-Sheet 2

INVENTOR.
William E. Rise
BY
R. P. Barnard
ATTORNEY

United States Patent Office
3,042,181
Patented July 3, 1962

1

3,042,181
TANGLED SPRING SEPARATOR
William E. Rise, Detroit, Mich., assignor to General Motors Corporation, Detroit, Mich., a corporation of Delaware
Filed Jan. 27, 1960, Ser. No. 4,925
6 Claims. (Cl. 198—33)

This invention relates to article feeding apparatus and more particularly to a hopper type feeding device which is designed to automatically orient, untangle and feed spring members in a uniform position to other operating apparatus.

Various types of hopper devices designed for the purpose of arranging articles in a uniform position and feeding them to a machine from a mass of articles deposited in a hopper are well known in the art. Some of these devices are provided with a vibrational hopper that is actuated about a vertical axis so as to impart movement to articles deposited therein, and have a peripheral feed track which slopes upwardly from the bottom of the hopper in a spiral path for feeding the articles in advancing movement therealong to a discharge exit. These devices depend for their operation on baffle means to deflect articles that do not attain the selected position as they advance up the spiral path back into the hopper for another feed cycle until the articles are so positioned on the track that they are able to pass the baffle. Such mechanisms have previously been unable to economically handle articles such as spring members which are likely to become entangled when deposited into the hopper and which also tend toward entanglement because of the vibratory nature of the hopper. In previous practice it has been necessary for an operator to remove articles such as tangled springs from the hopper and separate them manually. Since the vibration of the hopper itself tended to tangle spring members it was impossible to utilize such a feed device without considerable labor expense.

It is the general object of my invention to provide an improved orienting and feeding device of the hopper type in which the orienting and feeding of entangleable articles is accomplished rapidly and economically.

Another object of my invention is to provide a hopper type feed device having means to automatically untangle the fed articles.

It is a further object of this invention to provide a feed hopper having improved means to prevent the passage of improperly positioned articles to the receiving end of a feed track.

These objects are obtained in the present invention by providing a vibratory hopper into which the articles to be fed are indiscriminately deposited; and having means within the hopper to deposit and move the articles along a peripheral trackway sloping upwardly from the bottom of the hopper in a spiral path which guides the movement of the articles thereon when the hopper is agitated at a rapid rate. Baffle elements projecting into the track are adapted to displace unoriented and entangled articles as they move along the trackway onto a chute that carries the articles into the path of a rotating blade which strikes the tangled members to disengage them and return them to the bottom of the hopper in an untangled condition for another feed cycle.

These and other objects and advantages of the invention will become apparent by reference to the following detailed description and the accompanying drawings that illustrate the preferred embodiment of the invention and in which:

FIGURE 1 is a side elevational view of the preferred embodiment of my invention;

2

Figure 2:
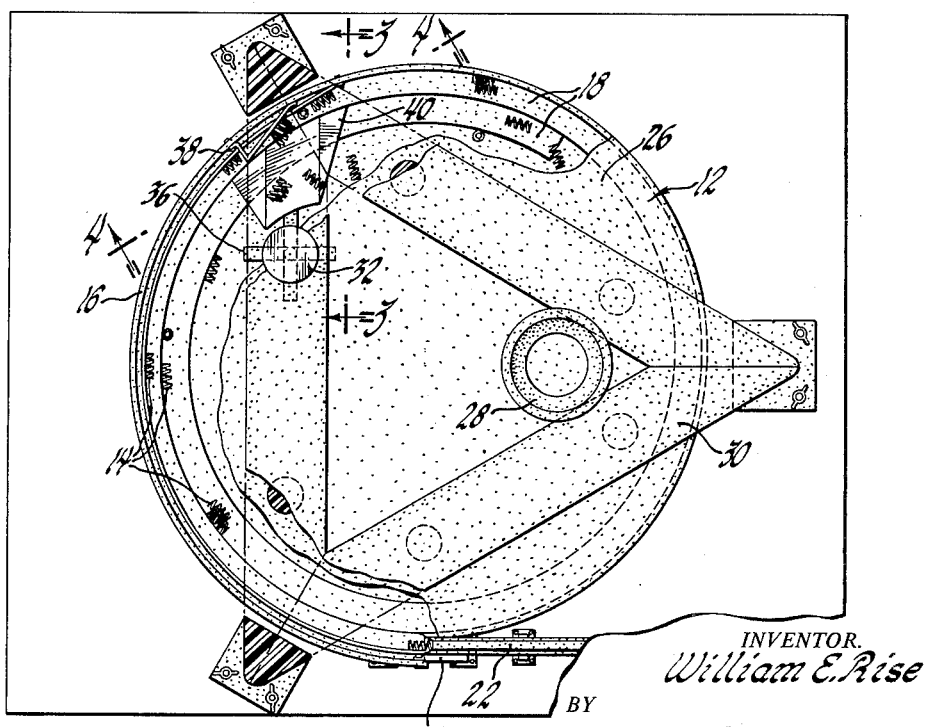
Figure 3:
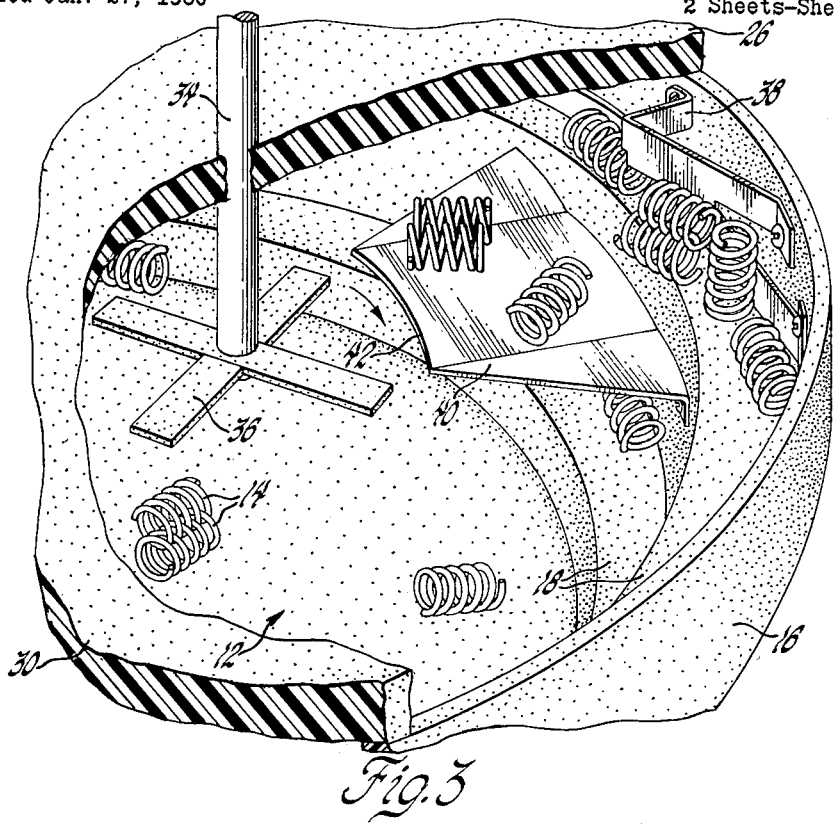
Figure 4:
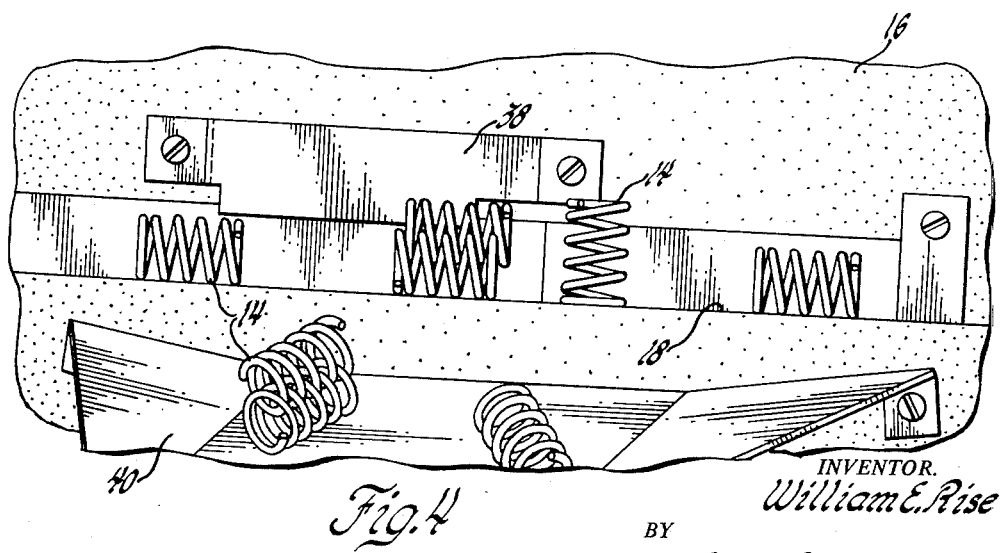

FIGURE 2 is a plan view of the apparatus shown to FIGURE 1;
FIGURE 3 is a perspective view partly in section of the interior of the apparatus shown in FIGURE 1; and
FIGURE 4 is a detail view of my invention.

Referring now to FIGURE 1, a stand or base member 10 supports hopper type apparatus comprising a vibratory bowl 12 that is adapted to contain a plurality of spring members 14. The bowl 12 is fixed to an actuating device, not shown, which agitates the hopper bowl about a vertical axis of the bowl at a predetermined frequency to agitate the spring members to the periphery of the bowl and upwardly along a spiral path as is well known in the art and, therefore, needs no further description. The wall 16 of the bowl is stepped to provide a peripheral, spiral feed track 18 extending from a curved bottom surface 20 that slopes toward the side walls to a conveyor mechanism comprising a conveyor belt 22 rotatably supported on a pulley member 24. The vibratory bowl is further provided with a cover 26 that includes a hopper feed chute 28 to provide a loading opening for the spring members.

A motor support bracket 30 is fixed to the base 10 and extends upwardly and outwardly over the vibratory bowl 12. A small fractional horsepower electric motor 32 is mounted on the support bracket motor 30 and has a drive shaft 34 extending downwardly through the cover 26 into the interior of the vibratory bowl. A multi-blade rotor 36 having an impact resistant peripheral surface of nylon or other suitable material is fixed to the end of the drive shaft 34 for a purpose to be hereinafter described. A baffle member 38 is fixed to the wall 16 of the vibratory bowl and extends inwardly over and along the peripheral spiral feed track 18. The baffle is spaced above the track a distance sufficient to allow the conveyed articles to pass between the baffle on the track if they are correctly positioned. Directly below the baffle 38, a trough 40 is fixedly secured to the wall of the vibratory bowl and slants inwardly and downwardly so that a lower lip 42 is spaced closely adjacent the multi-blade rotor 36.

In operation of the device a quantity of spring members are indiscriminately deposited on the curved bottom 20 of the hopper through the feed chute 28 and the hopper is agitated by the aforementioned vibrating apparatus. The springs 14 are driven along the curved bottom surface to the peripheral spiral track 18 and thence upwardly along the spiral track toward the conveyor belt 22. Those spring members which are not longitudinally parallelly positioned to the track are deflected off the track when they reach the baffle member 38 and onto the guide trough 40. The inclination of the trough 40 guides the spring members into the path of the rotating blades 36 or other suitable striker mechanism whereat the tangled spring members receive sharp blows which disengage them and return them to the bottom of the bowl in an untangled condition for another feed cycle. The striker mechanism provided by this invention to deliver sharp momentary blows to tangled members to drive them apart is to be differentiated from pusher mechanism which is sometimes provided in feed mechanism to push articles along a feed path.

It is to be observed that the apparatus is adaptable for other articles capable of entanglement and sturdy enough to withstand sharp blows which will tend to disentangle them. Therefore, any such obvious modifications in my device are intended to be within the scope of my invention as defined by the appended claims.

I claim:
1. In a device for automatically feeding and orienting individual articles in a predetermined condition from a common mass in a container to an exit, a curved pe- ripheral trackway extending from the bottom of said container to the top thereof adjacent said exit, oscillating means for agitating the container so as to elevate said articles up the trackway, means located adjacent the trackway for ejecting from the trackway all the advancing articles except those advancing in a single file in a predetermined condition, a movable striker member supported within said container above said common mass and having no contact therewith, power means to rapidly move said striker member at speeds whereat sharp momentary blows may be imparted to the ejected articles, and means to guide the ejected articles into the path of movement of said striker member whereby the ejected articles will be given a sharp blow to facilitate acquisition of the predetermined condition.

2. A tangled member separator comprising a container for entangleable members, means for moving said members along a pathway of varying elevations to an exit from said container, baffle means positioned along said pathway and adapted to displace entangled members therefrom, trough means adjacent said baffle means for guiding said displaced entangled members inwardly and downwardly to conform to a preselected path, a striker mechanism periodically positioned in said preselected path, and means to actuate said striker mechanism at speeds whereat sharp momentary blows are imparted to the displaced members whereby said entangled members will be driven apart thereby.

3. A spring feed mechanism comprising a vibratory bowl, a curved spiral trackway extending from the bottom of said bowl to an exit near the top of said bowl, means to agitate said bowl to drive springs upwardly along said spiral trackway, baffle means provided on said trackway to displace springs moving along said path in entangled condition, and power operable striker means supported within said bowl and positioned to drivingly disassociate the entangled springs displaced from said path.

4. Apparatus as defined in claim 3 and having a trough extending inwardly and downwardly from said spiral trackway and positioned below said baffle means and terminating adjacent said striker means.

5. A coiled spring feed mechanism comprising a vibratory bowl, a curved spiral trackway extending from the bottom of said bowl to an exit near the top of said bowl, means to agitate said bowl to drive springs contained therein upwardly along said trackway to said exit, baffle means provided along said trackway to displace entangled springs moving therealong, a power source supported adjacent said bowl and having a drive shaft extending into said bowl, a movable member fixed to said shaft within said bowl and driven thereby, and a guide member supported adjacent and below said baffle means and extending downwardly and terminating adjacent said path of said movable member whereby entangled springs displaced by said baffle means are guided into engagement with said movable member to be drivingly disassociated thereby.

6. In an article separator the combination of a feed container having an exit therefrom, means agitating the container, a trackway of varying elevations positioned within the container and extending to the exit, the trackway being so arranged that when the container is maneuvered by the agitating means, the articles are caused to proceed along the trackway to the exit, a guideway adjacent the trackway and at one of the elevations, means positioned along the trackway for deflecting all articles proceeding along the trackway except those articles proceeding in a predetermined condition onto the guideway, and striker means situated relative to the exit of the guideway and operative to give sharp blows to the articles proceeding along the guideway so as to facilitate the restoration thereof to the predetermined condition.

References Cited in the file of this patent
UNITED STATES PATENTS

| | | |
|---|---|---|
| 2,609,914 | Balsiger | Sept. 9, 1952 |
| 2,737,286 | Kibler | Mar. 6, 1956 |
| 2,752,618 | Stern | July 3, 1956 |
| 2,806,494 | Kull | Sept. 17, 1957 |
| 2,867,313 | Deshaw | Jan. 6, 1959 |